(No Model.)

G. HARVEY.
DRAFT HOOK.

No. 417,180. Patented Dec. 10, 1889.

Witnesses:
Geo. E. Fitch.

Inventor
George Harvey
By his Attorneys

UNITED STATES PATENT OFFICE.

GEORGE HARVEY, OF FORRESTVILLE, CALIFORNIA.

DRAFT-HOOK.

SPECIFICATION forming part of Letters Patent No. 417,180, dated December 10, 1889.

Application filed May 17, 1889. Serial No. 311,146. (No model.)

*To all whom it may concern:*

Be it known that I, GEORGE HARVEY, a citizen of the United States, residing at Forrestville, in the county of Sonoma and State of California, have invented a new and useful Draft-Hook, of which the following is a specification.

This invention has relation to draft-hooks, and is especially designed for use in connection with the wire ropes or cables employed for drawing extremely-heavy loads, as in mines and in lumber regions.

Among the objects in view are to provide a hook so constructed as to obviate the necessity of any knotting or abrupt bending of the cable, which may be quickly and easily adjusted to the cable and as quickly removed therefrom, and one in which the draft itself will serve to maintain a secure connection between the cable and the hook.

The invention consists in certain features of construction hereinafter described, and more particularly pointed out in the claims.

Figure 1:
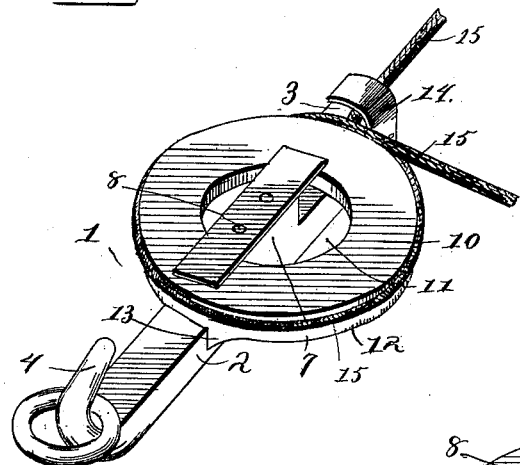
Figure 2:
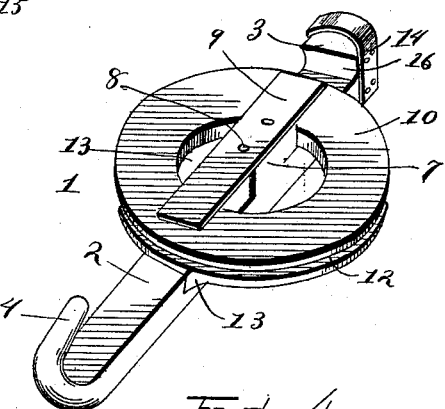
Figure 3:
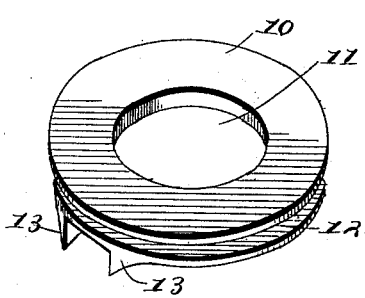
Figure 4:
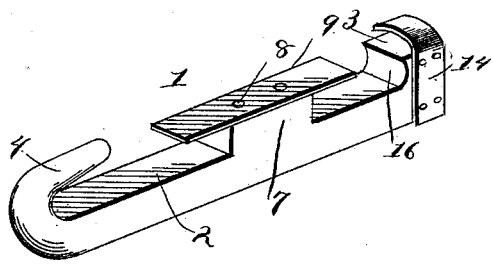

Referring to the drawings, Figure 1 is a general view showing my invention applied to a cable. Fig. 2 is a perspective; and Figs. 3 and 4 are perspectives in detail of the clutch disk or ring and the hook, respectively.

Like numerals of reference indicate like parts in all the figures of the drawings.

In practicing my invention, 1 represents a heavy strong hook, the same consisting of a long-shanked portion 2, terminating in a shoulder 3, and an opposite hook 4, to which is connected the horses or other moving medium.

Intermediate the two ends of the hook and upon its upper surface I form, either integral or separate, an upwardly-projecting lug 7, to the upper end of which is secured by any suitable means, and in this instance by bolts 8, a longitudinally-disposed head 9, the opposite ends of which project beyond the lug for some distance.

10 represents a metal disk of ring shape, which is formed with a central opening 11, considerably larger than the lug 7 and mounted thereon, and of a thickness in cross-section substantially agreeing with the space intermediate the shank 2 of the hook and the under surface of the head 9 of the lug, whereby said disk is permitted to move freely upon the lug, and is embraced or maintained in position by the overlapping terminals of the head. The periphery of the ring or disk is provided with an annular cable-receiving groove 12, of a depth considerably smaller or less than the thickness of the cable and merely sufficient to serve as a guide, the body of the cable when mounted in the groove projecting from the periphery of the disk or ring. The disk or ring is merely intended for longitudinal reciprocation upon the shank 2 of the hook, and to prevent its turning on the shank I provide upon the rear surface of the ring opposite lugs or ears 13, intermediate which the shank is designed to be located. At one side of the shoulder 3, in this instance at the right side, I provide, either integral or separate, an inverted-L-shaped rope-reciving guide 14, which is adapted for the reception of the cable or rope.

15 represents the draft-cable, one end of which is made fast to a log or other heavy object by any usual means, and the free end of the cable, or that portion thereof near the free end, is inserted in the groove 12 of the movable ring or disk and between the periphery of said ring and the inner surface or end of the shoulder 3. The cable is then carried around the ring or disk toward the free end by the same, and under the inverted L-shaped guide 14. The draft is now applied and the cable is straightened or made taut by the hook being drawn in the direction of the draft, and the cable serves to draw the ring in an opposite direction, whereby the periphery of said ring is moved against and impinges the terminal or portion near the same of the cable against the inner surface of the shoulder 3, and the greater the draft the stronger and the more securely is the cable held, and this without any bending or undue marring of the cable, the latter being prevented by reason of a shallow transverse groove 16, formed in the inner surface of the shoulder 3 and in line with the groove 12, formed in the periphery of the ring.

Having described my invention and its operation, what I claim is—

1. The combination, with the shank of a draft-hook provided with a shoulder, of a non-rotatable sliding disk mounted on the hook and adapted to be brought against the shoulder, substantially as specified.

2. The combination, with the shank of a draft-hook terminating in a shoulder and having an intermediate lug, of an open non-rotatable sliding ring mounted on the lug and adapted to be brought against the shoulder, substantially as specified.

3. The combination, with the shank of a draft-hook terminating in a lug, and a guide, of a rope-receiving disk mounted to slide on the shank and adapted to receive a cable passed through the guide and around the disk and terminating intermediate the guide and disk, substantially as specified.

4. The combination, with the shank of a draft-hook terminating in a shoulder and having an intermediate lug and longitudinally-disposed head, of a non-rotatable sliding disk perforated to receive the lug and mounted to move between the shank and head and provided with opposite shank-embracing arms, substantially as specified.

In testimony that I claim the foregoing as my own I have hereto affixed my signature in presence of two witnesses.

GEORGE HARVEY.

Witnesses:
S. G. THOMPSON,
N. E. MANNING.